United States Patent [19]

Beshears et al.

[11] Patent Number: 5,621,884
[45] Date of Patent: Apr. 15, 1997

[54] DISTRIBUTED DATA ACCESS SYSTEM INCLUDING A PLURALITY OF DATABASE ACCESS PROCESSORS WITH ONE-FOR-N REDUNDANCY

[75] Inventors: Norman J. Beshears, Orange; Douglas Flanagan, Hermosa Beach; Peter Y. Kui, Laguna Niguel, all of Calif.

[73] Assignee: Quotron Systems, Inc., Los Angeles, Calif.

[21] Appl. No.: 375,388

[22] Filed: Jan. 18, 1995

Related U.S. Application Data

[63] Continuation of Ser. No. 55,849, Apr. 30, 1993, Pat. No. 5,408,649.

[51] Int. Cl.$^6$ .................................................. G06F 11/34
[52] U.S. Cl. .................. 395/182.08; 364/282.1; 364/DIG. 1; 395/610; 395/618
[58] Field of Search ........................ 395/575, 600, 395/180, 181, 182.01, 182.08, 182.09; 371/8.1, 11.3, 11.1, 7; 364/282.1, 229.4, 937.01, 935.45, 931.43, 269.9

[56] References Cited

U.S. PATENT DOCUMENTS

| | | | |
|---|---|---|---|
| 4,347,563 | 8/1982 | Paredes et al. | 364/137 |
| 4,412,287 | 10/1983 | Braddock, III | 364/408 |
| 4,486,853 | 12/1984 | Parsons | 364/900 |
| 4,630,196 | 12/1986 | Bednar, Jr. et al. | 364/200 |
| 4,634,110 | 1/1987 | Julich et al. | 371/11 |
| 4,685,125 | 8/1987 | Zave . | |
| 4,686,620 | 8/1987 | Ng | 364/200 |
| 4,710,926 | 12/1987 | Brown et al. | 371/9.1 |
| 4,800,485 | 1/1989 | Ackroff et al. | 364/200 |
| 4,805,134 | 2/1989 | Calo et al. | 364/900 |
| 4,823,256 | 4/1989 | Bishop et al. | 364/200 |
| 4,868,818 | 9/1989 | Madan et al. | 371/11.3 |
| 4,894,828 | 1/1990 | Novy et al. | 371/11.3 |
| 4,933,838 | 6/1990 | Elrod | 364/200 |
| 4,945,474 | 7/1990 | Elliott et al. | 364/200 |
| 4,949,248 | 8/1990 | Caro | 364/200 |
| 4,975,838 | 12/1990 | Mizuno et al. | 364/200 |
| 5,056,077 | 10/1991 | Collins, Jr. et al. | 364/200 |
| 5,058,105 | 10/1991 | Mansour et al. . | |
| 5,084,824 | 1/1992 | Lam et al. . | |
| 5,086,429 | 2/1992 | Gray et al. | 371/9.1 |
| 5,109,384 | 4/1992 | Tsaung | 395/575 |
| 5,117,352 | 5/1992 | Falek | 395/575 |
| 5,117,422 | 5/1992 | Hauptsheins et al. | 370/95.1 |
| 5,123,099 | 6/1992 | Shibata et al. | 395/425 |
| 5,136,498 | 8/1992 | McLaughlin et al. . | |
| 5,140,685 | 8/1992 | Sipple et al. | 395/425 |
| 5,146,452 | 9/1992 | Pekarske | 370/16 |
| 5,167,035 | 11/1992 | Mann et al. | 395/575 |
| 5,170,480 | 12/1992 | Mohan et al. | 395/600 |
| 5,182,744 | 1/1993 | Askew et al. | 370/16 |
| 5,224,094 | 6/1993 | Maher | 370/62 |
| 5,228,038 | 7/1993 | Jestice et al. | 370/110.1 |
| 5,274,630 | 12/1993 | Jestice et al. | 370/58.1 |
| 5,297,262 | 3/1994 | Cox et al. | 395/325 |
| 5,307,481 | 4/1994 | Shimazaki et al. | 395/575 |

*Primary Examiner*—Robert W. Beausoliel, Jr.
*Assistant Examiner*—Albert Decady
*Attorney, Agent, or Firm*—Baker, Maxham, Jester & Meador

[57] ABSTRACT

In a distributed data access system in which a plurality of computers maintain and provide access to a database of stock exchange information, 1-for-N redundancy is provided by operating one computer in a standby mode, while the other computers operate online. Each online computer provides access to the database to a predefined set of a geographically broad plurality of users. The set of users for any online computer is defined by user connectivity data structures that define connectivity between the user set and the computer. When a failure is detected in any one of the computers, the user connectivity data structures of that computer are provided to the standby computer, which then assumes all operations of the failed computer. An arbitrator computer facility observes the health and determines the status of each of the computers, including the standby computer, and controls the transfer of online status from a failed computer to the standby computer. The arbitrator computer facility is a pair of redundant computers, one of which executes the arbitration function and the other of which operates as a standby.

11 Claims, 6 Drawing Sheets

DISTRIBUTED DATA ACCESS SYSTEM INCLUDING A PLURALITY OF DATABASE ACCESS PROCESSORS WITH ONE-FOR-N REDUNDANCY

This application is a continuation of application Ser. No. 08/055,849, filed Apr. 30, 1993, now U.S. Pat. No. 5,408,649.

BACKGROUND OF THE INVENTION

The invention described later in detail relates to distributed data access systems with a plurality of computers that afford database access to a group of geographically distributed users. More particularly, the invention concerns a distributed data access system having a plurality of computers with 1-for-N redundancy in which one of the computers is operated on a standby basis, ready to assume operation of any of the other computers in the event of failure in that computer.

The invention operates in a system that provides a variety of financial data services to subscribers through terminals that access a financial information database. In a prior system, trading information from various stock exchanges, news information from news services, and other information from private databases was transmitted over conventional means to each of a plurality of regional communication centers (RCC). The RCC's were geographically distributed throughout the United States, each serving to assemble and archive securities trading information, news service information, and private database information, and to distribute archived information through one or more concentrators to local users within the geographical area served by the RCC. For example, Quotron Systems, Inc., the assignee of this application, has maintained a financial information distribution network (the "QSI" network) including seven regional communication centers and over 200 concentrators in 50 different locations, all serving 5,000 users through 80,000 desk units.

Each RCC included at least one computer facility referred to as a regional computer (RC). Each RC comprised at least five computers connected together by a high speed channel. Two computers in the RC performed communication services, while at least three computers were provided for file services. Some RC configurations included six computers in which two were communication servers and four were file servers. In order to meet reliability, availability, and speed requirements, each RC architecture embraced 1-for-1 redundancy for each computer in the RC. Thus, an RC with six computers needed 12 computers in order to satisfy the redundancy requirements. In the QSI network, there were 45 RC's.

In order to reduce significant overhead expenses, including communication, equipment, and network costs, a system architecture has been proposed to consolidate the seven RCC's of the QSI network into a single, national distribution center. In order to reduce the complexity and potential downtime involved in changing to a single, national center, the seven regional partitions were retained. In the national center, one or more of the RC's is implemented in a respective one of a plurality of computer facilities. Each replacement computer facility is referred to as an XRC. The significant technological challenge in establishing and operating the national center with over ten XRC's was to provide stability and reliability of the flow of information in the event of XRC failure.

SUMMARY OF THE INVENTION

The invention achieves the requirements of stability and reliability in a distributed data access system including a plurality (N) of database computer facilities with 1-for-N redundancy. In this regard, a single database computer facility is provided on a standby basis permitting complete assumption by that standby computer facility of operation of any one of the plurality of computer facilities in which a failure is detected. The 1-for-N redundancy architecture of the invention avoids the considerable expense of the 1-for-1 redundancy which was required in the RCC architecture of the prior art.

The 1-for-N redundancy architecture of the invention also includes an arbitrator computer facility coupled to all of the database computer facilities. The arbitrator computer facility includes the ability to detect failure of any one of the database computer facilities and substitute the spare database computer facility in place of the failed one.

DETAILED DESCRIPTION OF THE PREFERRED EMBODIMENT

Figure 1:
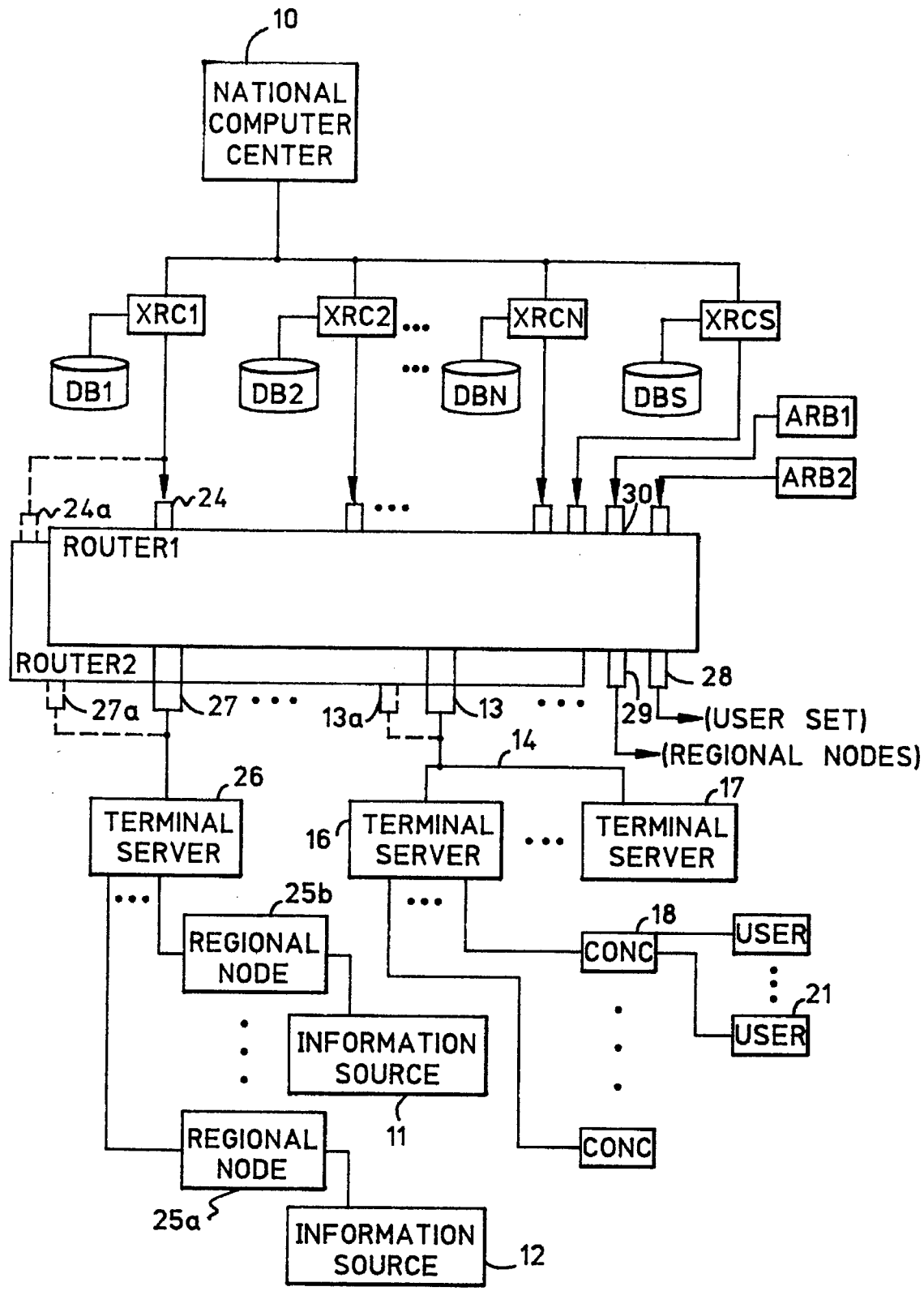
FIG. 1 is a block diagram illustrating the architecture of a distributed data access system with 1-for-N redundancy according to the invention.

A financial information system providing distributed access to a financial database is shown in schematic form in FIG. 1 and includes information sources such as a national computer center 10 and other information sources, two of which are indicated by reference numerals 11 and 12. The national computer center 10 includes a facility called a "ticker plant" which receives securities market data, processes the data, formats it, and then distributes it or broadcasts it via market feeds to the regional computers in the form of securities market information denoting the identity of a security and related transactional data such as price bid, price asked, selling price, lot size, and so forth. The invention does not encompass a ticker plant, but the information to which it provides access is presumed to have a structure imposed by a ticker plant. As is well known, such information is accessed by a plurality of geographically distributed equipments ("users") on the basis of security symbols.

Access to the information is provided by a plurality (N) of database computer facilities denoted as XRC1–XRCN. Each database computer facility maintains a current securities market database in which all security transaction information provided by the national computer center 10 is maintained and accessed by means of security symbols. The databases, which are identical, are denoted as DB1–DBN. A spare database computer facility (XRCSP) is maintained in a standby mode and includes a securities market database (DBSP) which is identical with the databases DB1–DBN. The system includes an arbitrator computer facility including a first arbitrator computer (ARB1) and a second arbitrator computer (ARB2). All of the database computer facilities, the spare computer database facility, and the arbitrator computers are interconnected for message-based communications by redundant routers denoted as ROUTER 1 and ROUTER 2. As shown in FIG. 1, ROUTER 1 includes a plurality of ports as does ROUTER 2. All of the XRCs, including the standby XRC, are connected to a first plurality of ports on ROUTER 1. Each of the arbitrator computers is connected to a respective port on a ROUTER 1. A second plurality of ports on ROUTER 1 is provided for connection to user sets. Each entity connected to a port on ROUTER 1 is also connected to a respective port on ROUTER 2.

The routers are conventional devices. Preferably, each router may comprise a corresponding product available from cisco Systems, Inc. The routers provide inter-computer communication based on the well-known transmission control protocol/internet protocol (TCP/IP). In this regard, each XRC, arbitrator computer, and user network may be uniquely identified by a gateway address identifying the router port to which it is connected. Provision of the gateway address in a formatted message enables a router to communicate a message received through one port to the port identified by the gateway address. Accordingly, the XRCs communicate with the arbitrator computers and with the user sets at the network level. This invention does not concern network communication, and it is asserted that the network interfaces are LAN based and are, therefore, conventional.

As FIG. 1 shows, each user set is accessed through a respective one of the second plurality of ports by way of a LAN (local area network)-based architecture. For example, communication of information to the user 21 is by way of the port 13, the LAN 14, a terminal server 16 which is connected to the LAN 14, and a concentrator (CONC) 18, which is one of a plurality connected to the terminal server 16. Thus, each user can be logically addressed by the concatenation:

PORT: TERMINAL SERVER: CONCENTRATOR: USER id

In the system of FIG. 1, user sets are established such that any particular user set is accessed through, and, therefore, defined by, the router port to which it is connected. Thus, all of the users which access ROUTER 1 through port 13 form a user set. In the system of FIG. 1, each user set is served by one respective XRC. Therefore, there is a 1-to-1 mapping from an XRC to a user set and from a user set to an XRC. For example, in FIG. 1, assume that the user set accessed through port 13 of ROUTER 1 is identified as user set 1 and is assigned to XRC 1. In this case, all communications to the users of user set 1 would be routed through XRC 1 and XRC 1 would communicate with no users save those in user set 1.

In the system of the invention, a user set implicitly defines a communication server set. A communication server set includes a first list of all terminal servers which provide access to the server set. In FIG. 1, this first list would include the terminal servers 16 and 17 and all other terminal servers necessary to access the users of user set 1. The communication server set also incudes a second list of terminal servers through which the user set obtains information from auxiliary information sources such as the sources 11 and 12 in FIG. 1. Such auxiliary sources may include private databases of enterprises which subscribe to the securities market information provided by the national computer center 10. Other information sources may include, for example, news services. Such auxiliary information sources are identified with regional nodes such as the regional nodes 25a and 25b which represent database computer facilities that organize and maintain databases through which information from the respective auxiliary information sources is obtained. The regional nodes of a communication server set are connected by way of one or more terminal servers such as the terminal 26 through a single port of a router such as port 27 of ROUTER 1.

Figure 2:
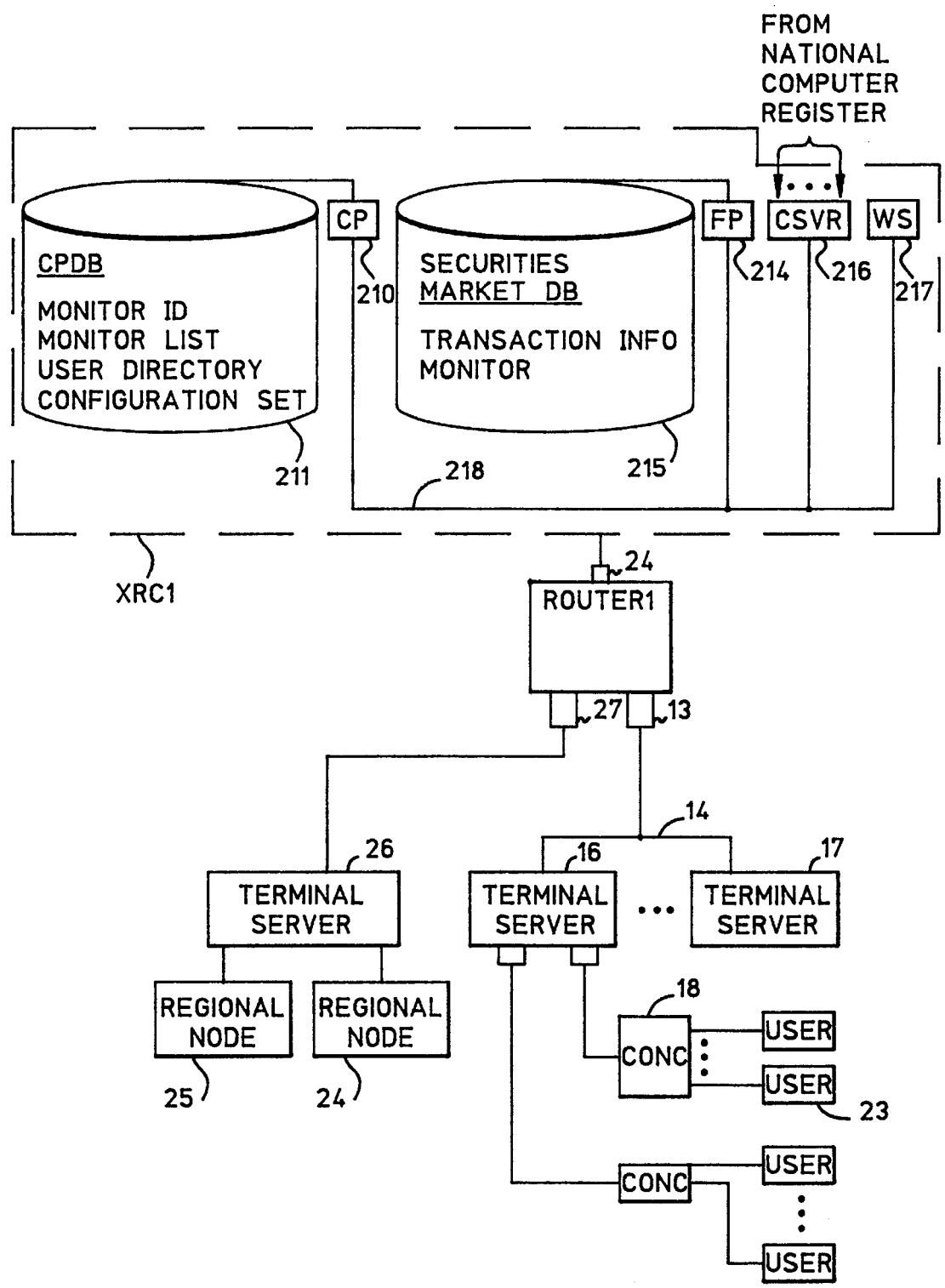
FIG. 2 is a block diagram illustrating in greater detail the architecture of a node of the system of FIG. 1 and its connection with a communications set.

FIG. 2 illustrates the architecture of XRC 1, with the understanding that this architecture is substantially identical to the architectures of all of the XRCs, including the spare one. XRC1 embraces a communication processor (CP) 210, a file processor (FP) 214, an update server for securities information updating (CSVR) 216, and an Xstation (XS) 217. The components of the XRC are connected together conventionally for communication on a local area network (LAN) 218. The LAN 218 is also connected to the port 24 of ROUTER 1, which is identified by the gateway address for XRC1. The communication processor 210 is dedicated to the XRC1 and handles routing of all messages to and from users which define the communication server set to which XRC1 is mapped. In order to perform message switching to either the file processor 214 or to the regional nodes accessed through the terminal server 26, the communication processor 210 maintains a database 211 including four data structures of interest. The first data structure, entitled MONITOR ID, lists, by symbol, securities for which coded MONITOR requests have been received from the user set. MONITOR ID is used in the best mode of the invention to map numeric codes to ASCII symbol representations. Thus, the XRC may transmit trading activity off of a monitored symbol by identifying the particular security by its numeric code. The communications processor 210 maps the numeric code to the security symbol by way of the MONITOR ID data structure. The second data structure is entitled MONITOR BIT MAP. The MONITOR BIT MAP is a table of bits with one bit for each possible user in a common server set. There is a bit map for each service provided on each exchange for each symbol. Thus, for each symbol, there is a bit map for each service on each exchange on which the security trades. The third data structure is a user directory which lists all users of a user set which have transmitted SIGN ON messages to XRC1. The fourth data structure is a configuration set which lists for each terminal server in the communications server set particular parameters affecting communications conducted for the terminal servers. Two such parameters would include, for example, baud rate and message format. Hereinafter, these data structures are referred to as "connectivity data structures".

The file processor 214 maintains a security market information database 215 in which security market transaction information is stored and indexed by security symbol and exchange. Included in each record in the database is the monitor ID for that symbol if an ID exists. Also included is a bit for each monitor service type. A bit is set if any user is using that service to monitor activity on that symbol.

The communication server 216 is dedicated to XRC1 and provides connection to update lines connected to the national computer center 10.

The Xstation 217 provides an XRC manager with access to the components of XRC1 by conventional input/output means, including a conventional menu-driven interface connected by known means to a QWERTY keyboard, a pointing device, and a display screen.

Figure 3:
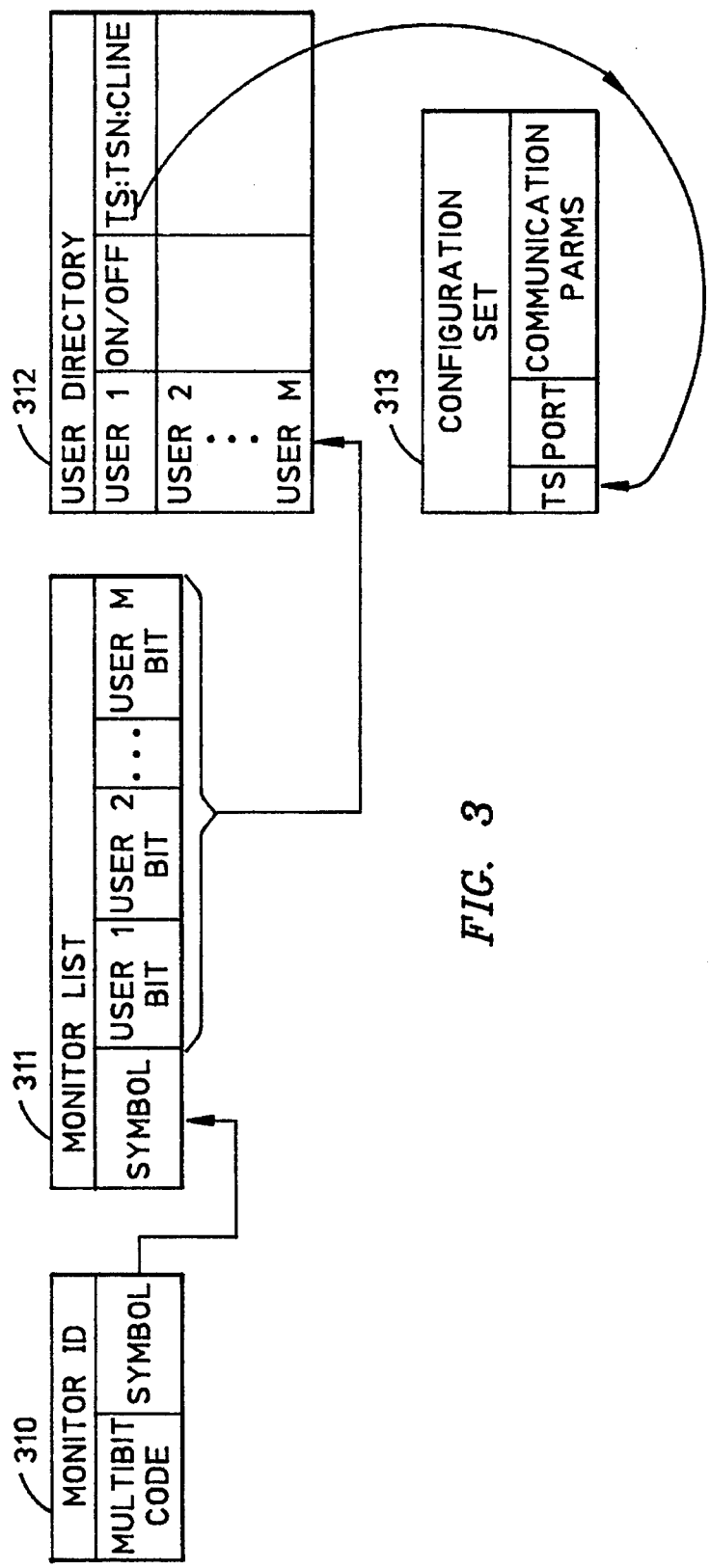
FIG. 3 is a block diagram illustrating a first set of data structures used in the invention.
Figure 4:
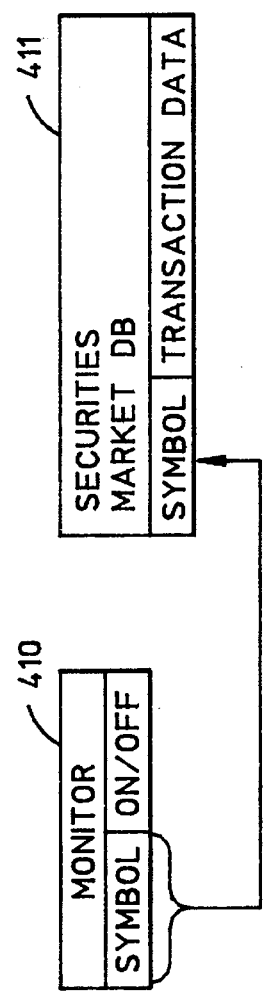
FIG. 4 is a block diagram illustrating a second set of data structures used in the invention.

FIG. 3 illustrates the connectivity data structures maintained by the communication processor 210 of XRC1 and by all on-line XRC's. The monitor id structure 310 has the format illustrated in FIG. 3, which maps selected symbols in a set of security symbols to a unique multi-bit code employed by regional systems to identify symbols. The mapping from monitor id 310 is to a symbol directory in the user bit map structure 311 contains an entry for each security received on the market feeds via the update server. For each security in the symbol directory there is a list of exchanges on which the security trades various types of data (or services) are available for each trade. Thus, there is a user bit map for each service. Each entry in the user directory 312 includes, in the USER field, an ASCII code identifying a user followed by a bit-wide field which is set when a user signs on and reset before sign on and after sign off. There is also a pointer to routing data structure which defines the communication route to the user through the router port allocated to the user set. In this regard, the routing data structure includes, at a minimum, the identification of a terminal server (TS), a terminal server port, and a concentrator line (CLINE). Relatedly, the terminal server identification maps to one of the terminal servers which support the users in the user set. Each terminal server includes a plurality of nodes for serial connection to a respective concentrator. Therefore, identification of a port identifies a concentrator. Similarly, each concentrator includes one or more lines, each of which is connected to a computer, processor, or terminal identified as a user. Therefore, identification of the concentrator line (CLINE) identifies the path between the concentrator and a user and, by implication, the user. The configuration set data structure 313 lists, by terminal server (TS), the communication parameters (PARMS) and parameter values which must be observed in communications with the identified terminal server. FIG. 4 illustrates the data structures in the database of an XRC file processor. A monitor id field indicates whether a particular security identified by a symbol has a monitor id. Each entry also includes a bit map with a bit for each type of service which may be monitored.

Refer now to FIGS. 2, 3, and 4 for an understanding of certain communications protocols in the system of FIG. 1. Initially, a user in the user set served by the XRC1 will send a SIGN ON message including a preamble with a routing data structure for the user. The SIGN ON message is routed to the communication processor 210 which sets the active bit for the user and enters the routing data structure in the user directory 312. Now, the communication processor can respond appropriately to any message received from the user. In this regard, the user may send inquiries about securities identified in the inquiry messages by security symbol and exchange. The communication processor transmits the inquiry messages to the file processor 214, seeking the requested transaction data. The file processor returns the data to the communication processor, which forwards the data to the requesting user, using the routing data structure in the user directory 312. Assume that a user transmits a MONITOR ADD message, signifying that all market activity for an identified security is to be provided continuously to the user as it becomes available. Upon receipt of a MONITOR ADD message, the communication processor sets a bit in the monitor bit map entry for the symbol which corresponds to the user. The MONITOR ADD request is then forwarded to the file processor which sets the corresponding bit in the monitor service bit map which it maintains by security. Now, each time an updating transaction for the security is received, the file processor 214 will forward the information to the communication processor 210 who will then place the information in a respective message for each user whose bit is set in the security's symbol entry of the monitor bit map 311. In the message sent to the user, the symbol is identified by the monitor ID entry if one exists.

Assume next that a user who has signed on transmits a NEWS message, requesting news concerning a particular security. The communication processor 210 obtains the security symbol via the database structure 310, identifies the regional node through which access to the necessary information source is obtained, and the terminal server serving that node, from the communication server set. The request is then dispatched via the identified terminal server and the response received by the communication processor 210 is forwarded to the requesting user.

With this explanation, it should be clear that, in the event of a failure in XRC1, the spare XRC can be substituted in place of XRC1 by configuring it with at least the connectivity data structures illustrated in FIG. 3. The arbitration scheme of the invention, implemented in the arbitration computer facility, ensures that these functions are performed by periodically polling the on-line XRCs as to their state of health (SOH), by periodically checkpointing the communication processor databases of the on-line XRCs, and by configuring the spare XRC for operation when a failure is detected by providing it with the connectivity data structures of the failed XRC.

Figure 5:
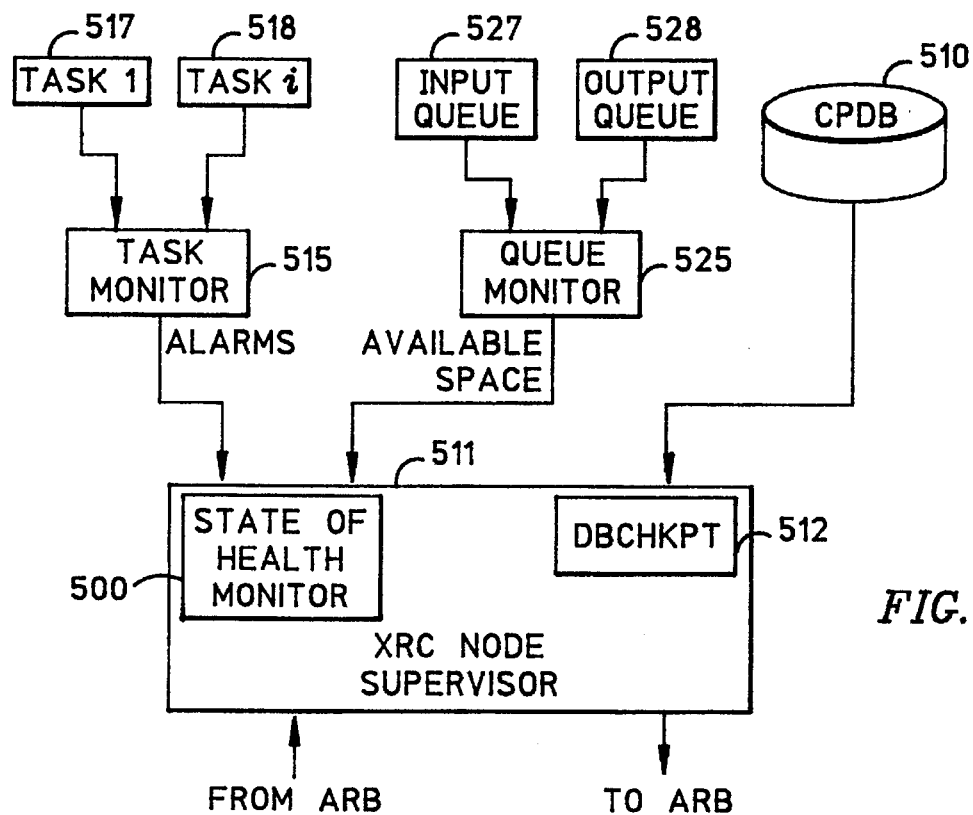
FIG. 5 is a block diagram illustrating architecture for monitoring the state of health in a computer facility of the system of FIG. 1.

State of health is monitored in each XRC in order to allow timely detection of hardware or software malfunctions in any given component of the XRC and to report such malfunctions to the arbitrator computer facility. This is illustrated in FIG. 5 which shows the SOH architecture for an XRC. The XRC includes an XRC node supervisor 500 with a state of health monitor process 511 and a database checkpoint process (DBCHKPT) 512 coupled to the communication processor database 510 of the XRC. The state of health monitor process 511 is coupled to a respective task monitor in each XRC component. One such task monitor 515 is shown in FIG. 5. The task monitor 515 reports alarms (516) which indicate either process termination or degradation in executing tasks, including the tasks 517 and 518. The state of health monitor 511 is also coupled to a message queue monitor in each XRC component. One such monitor is indicated by reference numeral 525. The monitor 525 reports available queue space (526) in queues including input queue 527 and output queue 528. The XRC node supervisor is a process that executes in a designated component of the XRC; it communicates state of health by message with the arbitrator computer facility.

Preferably, the state of health monitor 511 dynamically monitors all critical software processes in every processor, attempts to restart terminated processes, and reports the inability to restart any process. In addition, all software processes are monitored for the occurrence of built-in alarms, each alarm occurrence being reported. Queue monitors observe message queue loading in every processor so that a process using a queue will not wait indefinitely if a queue is full. In the preferred embodiment, a queue is deemed full if 98% utilized, and a queue is deemed to fail if full for three successive monitor periods. The state of health monitor 511 is located in a particular processor of the XRC and exchanges handshake messages with task and queue monitors in the XRC. This message traffic provides a third state of health parameter which can be quantified by, for example, the number of collisions on the XRC's LAN.

The state of health monitor 511 calculates an XRC state-of-health value which is a relative weighted value expressed in percent of a maximum value. In the preferred embodiment, the state of health is maintained as a maximum value of 10,000. This value is reduced by a predetermined fixed value for each alarm recorded by a task monitor or a queue monitor. The current value is maintained by the state of health monitor 511 and periodically reported to an arbitrator computer in response to an XRC poll.

The node supervisor 500 also comprehends the database checkpoint process 512. This process provides for the copying of shared memory to a local disk and remote copying to an archive database in the arbitrator computer facility. The process 512 works conventionally in conjunction with database routines (not shown) to provide an abbreviated naming convention for naming files. The database checkpoint process of each XRC is programmed to periodically transfer shared memory segments to the archive database. The transfer process is a remote calling process (RCP) conducted through the transport layer in the operating system software of an arbitrator computer. When an XRC is in an on-line status, its database checkpoint process will periodically name and transfer the connectivity data structures described above and illustrated in FIG. 3. These structures are saved in the arbitrator computer facility for XRC switchover in case of failure.

Figure 6:
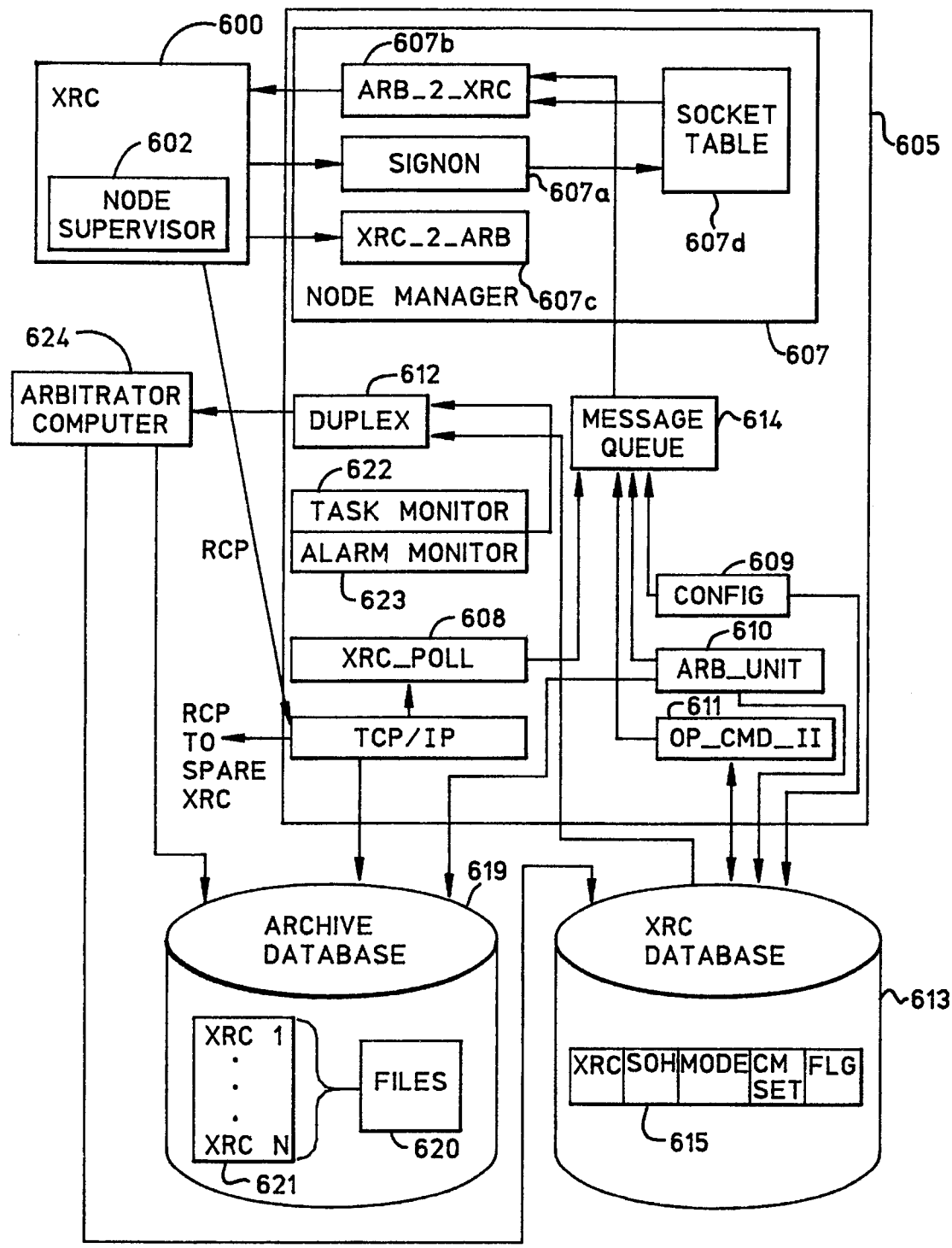
FIG. 6 is a block diagram illustrating the architecture of computer software used to practice the invention.

FIG. 6 illustrates functional components of the system of FIG. 1 which implement the invention. These functional components represent the computer programs and routines which are executable on the XRC's and arbitrator computers, as well as databases maintained at the arbitrator computer facility. The computer programs and routines are written in the well-known C language and are compiled and executed on their respective computers.

The architecture of FIG. 6 illustrates the structure of, and interconnections between, a single XRC 600 and an arbitrator computer 605, with the understanding that these are representative for all XRCs and both arbitrator computers. As described earlier, the XRC 600 executes a node supervisor process 602. The node supervisor 602 forms the primary interface between the state of health functions and the communication processor database of the XRC 600 on the one hand and the arbitrator computer 605 on the other hand. In the arbitrator computer 605, a node manager process 607 interfaces with the node supervisor 602. A polling process 608 (XRC_POLL) periodically polls the XRCs for state of health information. Other processes which execute on the arbitrator computer 605 and which are of interest in understanding the invention include a configuration process 609 (CONFIG), an arbitration process 610 (ARB_UNIT), and an operation/command interface 611 (OP_CMD_IF). A DUPLEX process 612 interfaces with the other arbitrator computer in a manner described later. A message queue 614 supports conventional message-based interprocess communication in the arbitration computer 605. The arbitrator computer facility maintains two databases, an XRC database 613, and an archive database 616. The XRC database 613 is updated by two routines in the node manager process 607 and by the configuration process 609. The archive database 616 is updated by the on-line XRCs, using remote call procedures invoked by their respective database checkpoint process. Although both arbitrator computers can access these data bases, only the active one can read and update them.

The configuration process 609 provides for defining communications server sets. Each communication server set includes, at a minimum, the two terminal server lists as described above. Each set further includes the configuration of each terminal server listed. Each terminal server is configured by specifying the line type and speed of each of its serial ports. The line types identify particular regional nodes or concentrators. The arbitration process 610 downloads a configuration to an XRC upon initial installation, upon restart, or upon the XRC assuming control for a failed XRC. The initial configuration includes a communication server set, the state of health polling rates and the database checkpoint frequency. The configuration enables the XRC to determine which user set and which terminal servers it is servicing. The XRC creates its configuration set from the downloaded configuration. The user directory, monitor id data structure, and the monitor bit map structure are accumulated by the XRC as it services its user set. The arbitration process 609 maintains a data structure 615 in the database 613. The data structure is essentially a table in which each entry includes a field (XRC) to identify an XRC, a field (SOH) for containing a value corresponding to the state of health of the XRC, a field (MODE) indicating the mode of operation of the XRC, a field (CM SET) identifying the communications server set assigned to the XRC, and a field (FLG) containing a flag having a purpose discussed below.

The node manager process 607 provides a software interface between the arbitrator computer and XRCs. Three routines are included in the node manager 607: SIGN ON 607a, ARB_2_XRC 607b, and XRC_2_ARB 607c. The SIGN ON function processes the signon from each XRC as it connects to the arbitrator computer. When an XRC signs on, the XRC database 613 is updated with an entry for the XRC. The XRC is given a tag which is placed in the XRC field of the table 615 and an entry is made in a socket table 607d showing the communication path between the arbitrator computer and the XRC. The XRC can then be referenced by the tag and the correct socket can be found, given the tag. The ARB_2_XRC function 607b handles all communications to an XRC specified by a tag. All XRC-bound messages are given to this function for delivery to the XRC. The messages sent from the arbitrator computer to an XRC include:

request state-of-health
go ON LINE
go STANDBY
SHUTDOWN

The XRC_2_ARB routine 607c receives all traffic from XRC's other than signon requests. These messages include:

state-of-health
go ON LINE completed
go STANDBY completed

Information in message traffic from XRCs is recorded in the XRC database 613. The information is available to any process that accesses the database.

The XRC_POLL process 608 periodically generates a sequence of polling messages. Each is transmitted as a request state-of-health message to a respective XRC. The list of XRCs to poll is found in the XRC database 615. The XRC_POLL process also is provided with the completion status of file transfer from the XRCs to the archive database 619 and maintains a status log for such information.

The ARB_UNIT process 610 analyzes the state of health of each XRC based upon the information stored in the XRC database 613. The health information is in the SOH column of the table 615. Based upon the SOH for any XRC, the ARB_UNIT process 610 will initiate a switchover to a spare XRC when necessary.

An interface to a user is provided by the operator command interface process 611. This interface provides a user with monitor, control, and configuration capabilities. The interface is menu-driven, providing a user with, among other functions, monitoring XRCs, examining the XRC database, manually executing an XRC switchover, inspecting or modifying arbitrator computer facility parameters, displaying arbitrator computer status, and manually configuring communication server sets.

Last, the DUPLEX routine 612 provides state-of-health monitoring of each arbitrator computer of the arbitrator computer facility and determines which one of the arbitrator computers will perform an active role, and which will be standby.

The XRC database 613 is updated by the SIGNON routine 607a, by the configuration process 609, by the XRC_2_ARB routine 607c, and by the ARB_UNIT process 610. The archive database 619 is updated by a remote storage procedure (RCP) invoked by the database checkpoint processes in the XRCs. For each XRC, a periodic RCP is invoked to store the connectivity data structures maintained by the XRC; as described above, these include the monitor id, monitor bit map, user directory, and configuration set structures for the XRC. When stored in the archive database 616, these data structures are referred to as "checkpoint data". The checkpoint data for each XRC is stored in the archive database in a file set 620 which is indexed by XRC entries in a directory 621.

1-FOR N REDUNDANCY PROCESSING

Assuming initial setup and configuration of a system according to FIG. 1, an arbitrator computer designated as the active one will assume responsibility for redundancy processing. In redundancy processing it is assumed that there are N XRCs operating in a mode referred to as "online" in which each serves a particular user set by providing securities information and monitoring designated securities as described above. In this regard, the communication processor for each online XRC will maintain a communication processor database as described above including, at least, the monitor id, monitor bit map, user directory, and configuration set data structures described above. One XRC is operated in a standby mode and designated as a spare. Upon failure of any online XRC, the spare XRC is brought online to service the communication server set of the failed XRC. When the failed XRC is repaired, it becomes a spare. The determination of XRC failure and the switchover processing necessary to take a failed XRC off line, to configure a standby XRC to substitute for the failed one, and to switch the standby XRC over to online operation are performed by the active arbitrator computer. In this regard, the active arbitrator computer detects the failure of an XRC and proceeds with switchover. In the preferred embodiment, an operator can also request switchover through the active arbitrator computer.

Figure 7:
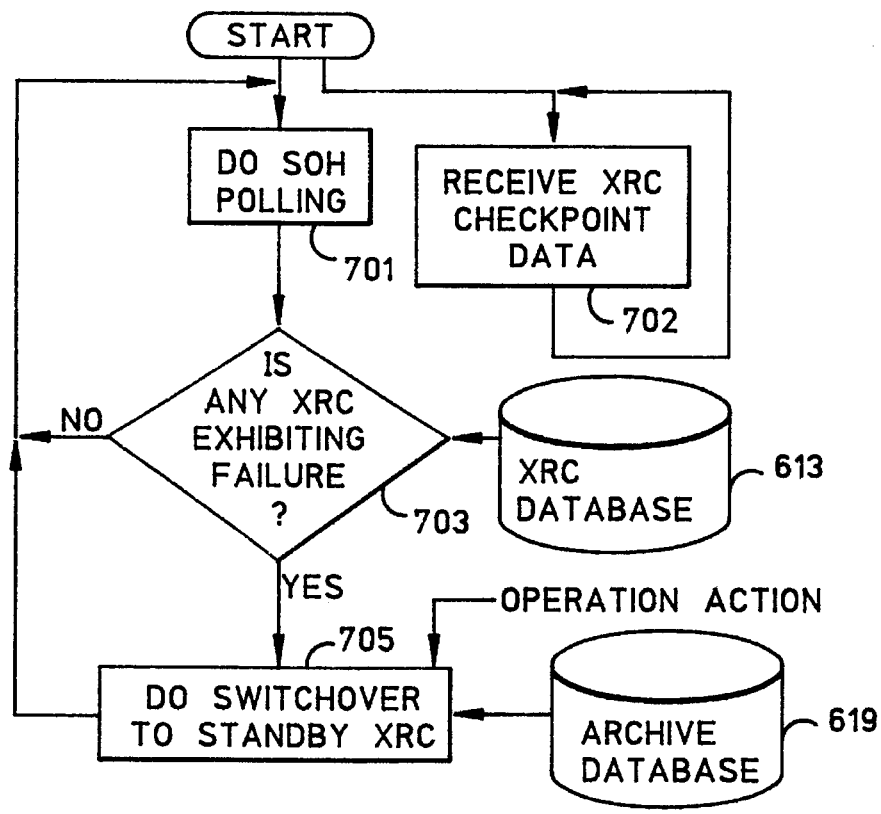
FIG. 7 is a flow diagram illustrating the major processing tasks executed by the arbitrator computer facility.

The process steps executed by the active arbitrator computer for monitoring and switchover are illustrated in FIG. 7. Initially, the arbitrator computer periodically polls all online XRCs and the standby XRC as to their states of health (SOH) in step 701. The state of health data is entered into the XRC database 613. In parallel with state of health polling, the XRCs periodically store their checkpoint data in the archive database of the arbitrator computer facility. The results of state of health polling are evaluated in step 703 using the XRC database 613 to determine whether any XRC exhibits a failure. Relatedly, a failure is deemed to occur whenever the reported state of health value for any XRC falls below a predetermined threshold. For so long as no online XRC exhibits failure, the active arbitrator computer executes a loop including steps 701 and 703. In the event that XRC failure is detected in step 703, the active arbitrator computer executes a switchover process in which the latest checkpoint data for the failed XRC is provided to the standby XRC while the failed XRC is shut down and the standby XRC is given online status. This processing is represented by step 705 in FIG. 7 and is executed using the archive database 616 of the arbitration computer facility.

Figures 8, 9:
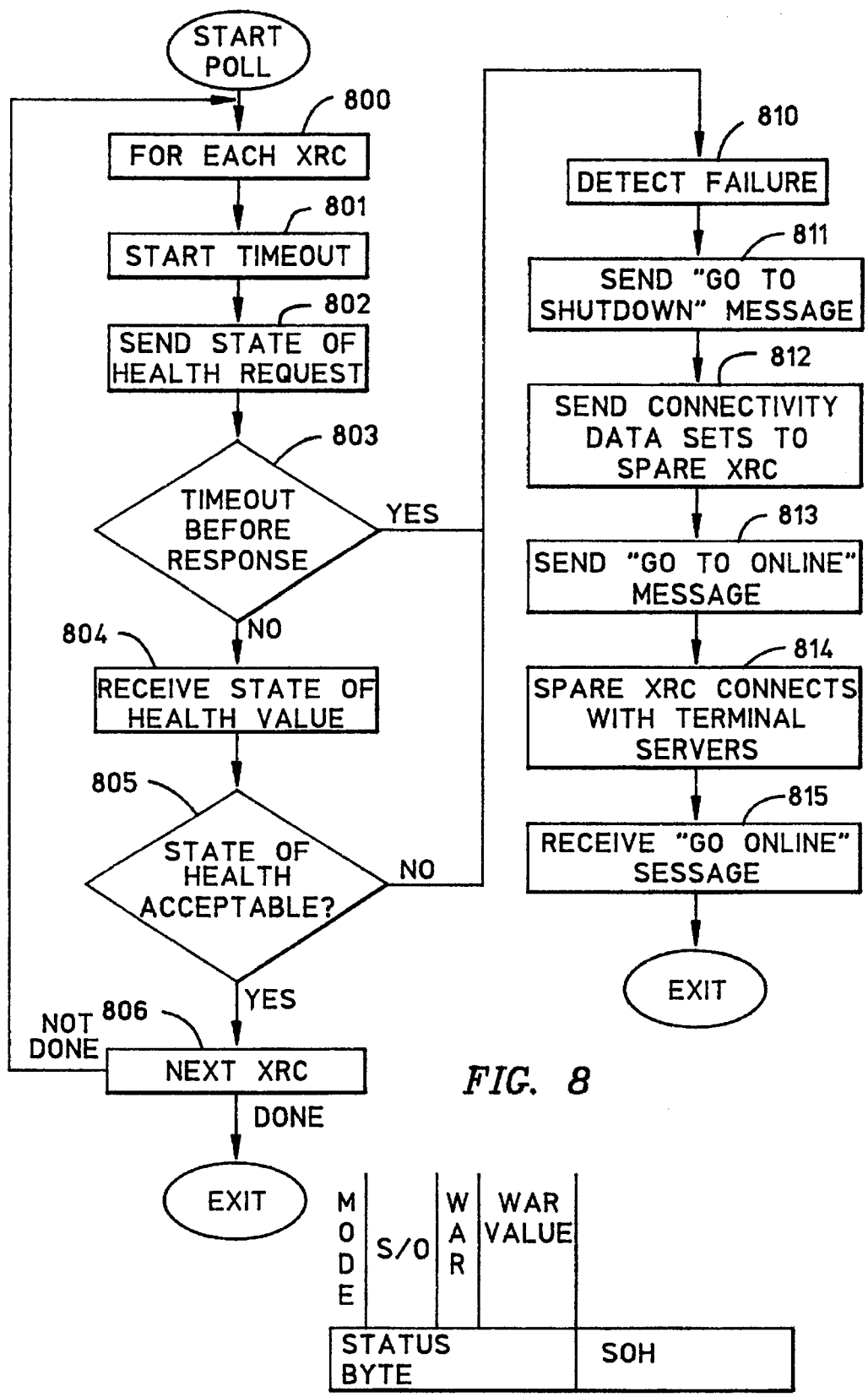
FIG. 8 is a flow diagram illustrating a switch-over process executed by the arbitrator computer facility.
FIG. 9 illustrates a data structure used by the arbitrator computer facility.

Switchover processing is illustrated in greater detail in FIG. 8. In FIG. 8, an evaluation loop including steps 800–806 is executed for each XRC each time the XRCs are polled as to their state of health. In this regard, step 800 counts the loop down for all of the XRCs including those with online and standby status. For each state of health request, a timeout is started in step 801. Assuming receipt of a response before the timeout is completed (step 803), the state of health parameter values for the XRC are entered into the XRC database and evaluated in step 805. When the last XRC polling message has been sent, the loop is exited. The loop then begins again with another polling sequence which begins after expiration of a prescribed interval.

In FIG. 8, if the timeout expires before an XRC provides a response or if the reported state of health value for the XRC is below the acceptable threshold, a failure is detected in step 810 and a shutdown message is sent to the failed XRC in step 811. This causes the failed XRC to close its connections to all of its terminal servers. Next, in step 812, the active arbitrator computer readies the spare XRC by downloading to it the latest checkpoint information stored in the archive database by the failed XRC. The active arbitrator computer will also force the terminal servers to disconnect from the failed XRC. In step 813, the standby XRC is sent a GO ONLINE message, in response to which it activates all necessary processes and routines. In step 814, the spare XRC undertakes any steps necessary to connect with the terminal servers in its communication server set when the process is exited. In this step, the XRC also configures its communication processor database by placing in it the connectivity data structures and configures its file processor database by forwarding to its file processor MONITOR requests for all securities whose symbols are included in the monitor list of the communication processor database. When all of its processes and routines are activated and any necessary connections are made, the standby XRC switches its internal mode to online and sends a GO ONLINE COMPLETED message to the arbitration computer in step 815. From this point, the (formerly) standby XRC serves the user set of the failed XRC as described above.

The frequency with which the loop 800–806 is executed is referred to as the "polling frequency". The polling frequency is programmed at the arbitrator computer facility and may be set at a rate which satisfies the reliability considerations of a particular design.

In the context of the software architecture illustrated in FIG. 6, the steps of FIG. 8 are executed as follows: the XRC_POLL process 608 periodically executes a polling sequence by generating a sequence of polling messages, each destined for an identified XRC. The sequence of state of health request messages is placed on the message queue 614 and sent one-by-one by the ARB_2_XRC process 607b. Responses include state of health values are received by the XRC_2_ARB process 607c which places the state of health parameter value for each XRC at the appropriate location for that XRC in the table 615. The ARB_UNIT process 610 is synchronized to the polling frequency in order to provide XRC management and assignment of user sets to the XRCs and to conduct the switchover processing illustrated in FIG. 8. This process runs periodically and examines the XRC database for active user sets. In this regard, for each user set, the process 610 determines if there is an XRC assigned to it, and if the XRC is in good health. If the XRC is in good health and has been assigned a user set (inferred from an entry in the CM SET field of the entry) its mode field is marked ONLINE. If the XRC state of health value is above the threshold but its CM SET field is empty, its MODE field is marked STANDBY. In addition to maintaining the MODE and CM SET fields of the XRC table entries, the ARB_UNIT process 610 performs the timeout and state of health evaluations of steps 803 and 805 of FIG. 8 and, if necessary, the switchover processing of steps 810–815. In this regard, assume a positive exit from decision 803 or a negative exit from decision 805. In step 810, the process 610 will reset the MODE field of the failed XRC from ONLINE to OFFLINE and will scan the XRC table 615 for an XRC in STANDBY operation mode. When a standby XRC is identified, it will be assigned the user set of the failed XRC by entering into its CM SET field the identification of the communication server set embracing the user set. While the switchover is occurring, the flag (FLG) field of the standby XRC is set to prevent the XRC from being selected for another user set. The flag will be reset upon the XRC transitioning to ONLINE mode and sending a GO ONLINE COMPLETED message. The ARB-UNIT process 610 will then reset the mode field for the XRC from STANDBY to ONLINE.

The method of the invention, which is implemented in the switchover process of FIG. 8, provides 1-for-N redundancy in that a single XRC can be operated in STANDBY mode as a potentially redundant instantiation of any online XRC. When failure is detected in an online XRC, the standby XRC is made fully redundant by downloading to it the appropriate connectivity data structures described above from the archive database. Manifestly, reliability considerations of any particular design may require the provision of more than one standby computer. In such instances, the architecture and procedure of the invention would still be applicable.

ARBITRATOR COMPUTER REDUNDANCY

Referring, again, to FIG. 1, it will be appreciated that the reliability of the 1-for-N redundancy provided by the invention is enhanced by the dual arbitrator computer architecture which the figure illustrates. The dual arbitrator computer architecture is operated in a duplex mode in which the arbitrator computers are essentially identical and one arbitrator computer assumes the active role of arbitrating the health and status of the XRCs, while the other stands by. In this regard, as the software architecture of FIG. 6 shows, each arbitrator computer includes a duplex process (indicated by reference numeral 612 in FIG. 6). The duplex process implements a redundancy supervisor in the arbitrator computer facility that provides state-of-health monitoring of each arbitrator computer and determines which will be assigned the active role. Relatedly, with reference to FIG. 6, the duplex process 612 is coupled for LAN-based communications through the router configuration illustrated in FIG. 1 with the second arbitrator computer, which is indicated by reference numeral 624 in FIG. 6. The duplex process is also connected to a task monitor process 622 and an alarm manager process 623 in the arbitrator computer 605. The duplex process 612 is enabled by the task and alarm manager 622 and 623 to determine the state of health of its arbitrator computer by monitoring task activity and alarm occurrence. The duplex process 612 calculates a state of health value in response to task failure and alarm occurrence reported by 622 and 623. In the preferred embodiment, the occurrence of a single alarm deemed critical will force the state of health measurement to a value which can cause a switchover. If two or more critical alarms occur, a switchover is forced. If any critical process dies and cannot be restarted, a switchover also is forced.

The duplex processes executing in each of the arbitrator computers 605 and 624 implement a duplexing algorithm. Initially, when both arbitrator computers start, they establish communications between themselves with a socket connection in each direction. Any arbitrator computer accepting a connection will use the related socket for receiving a handshake, and when it connects a socket to the other arbitrator computer, it will use that socket for transmitting a handshake. The handshake has the structure illustrated in FIG. 9 and consists of a STATUS byte and a state of health value (SOH). The STATUS byte has three initial bits MODE, S/D, and WAR. The MODE bit is set to indicate whether the arbitrator computer is active or standby, the S/D bit is a simplex/duplex indicating whether the connection to the other arbitrator computer is established. The WAR bit indicates that the arbitrator computer thinks there should be a WAR to establish the mode. The STATUS byte also includes a WAR value field for containing a four-bit randomly generated number. The state of health field contains a weighted value indicating what the arbitrator computer measures as its own relative health. Each arbitrator computer has a personal "name" which is an appropriate code identifying it. It is asserted that in the system of FIG. 1, name assignments for each XRC and arbitrator are generated at system set up by an operator. In addition, each XRC is provided with a "well-known name" that the XRCs will use to establish connections with an arbitrator computer. The "well-known name" is used by an XRC to obtain the network address of an arbitrator from a name server (not shown). Using the well-known name, the name server will supply the network address of each arbitrator. The XRC will try both arbitrators to assure it connects to the one which is master. The arbitrator computer not designated as active will send a STATUS byte with the WAR bit set and a WAR value of zero to force the other arbitrator computer to accept the active role. Once the initial mode of each arbitrator computer is established, the arbitrator computers periodically exchange handshakes. Each arbitrator computer monitors the received handshake. Each received handshake is monitored to be sure that it is received within a predetermined time period of the preceding handshake. Handshakes are further monitored to ensure that the active arbitrator computer has a state of health exceeding a predetermined threshold or exceeding the state of health of the standby arbitrator computer. If three handshakes in a row are missed by either arbitrator computer, it will take appropriate action dependent upon its operating mode. The arbitrator computer which is active will set its S/D bit to simplex, and either continue to send its handshake or try to reconnect its socket to the other arbitrator computer. If the standby arbitrator computer detects three handshake misses by the active arbitrator computer, it will assume the active mode, set its S/D bit to simplex, and try to re-establish communications with the other arbitrator computer.

Only the active arbitrator computer will respond to connection requests from XRCs. Only the active arbitrator computer will perform the processing described above in connection with FIGS. 7 and 8. Each on line XRC will periodically upload its archive database to the active arbitrator. The active arbitrator then transfers these files to the standby arbitrator. At a more frequent interval, the active arbitrator sends the XRC database to the standby arbitrator.

If either the active or the standby arbitrator computers see that the active arbitrator computer is failing in health, either can attempt to force a switchover. If the switchover is successful, the standby arbitrator computer will become active and will initiate a process forcing all of the XRCs to sign on to it. Once this occurs, the arbitration computer facility operates in a simplex mode until the failed arbitrator computer is repaired.

Each of the XRC nodes (1 through n) establishes which arbitrator it expects to be active. Upon a software connection to the assumed active arbitrator, the arbitrator will begin normal communications with the XRC node if the arbitrator is really the active one. If the arbitrator is the standby, it will send a message to the XRC node to inform it to use the other arbitrator (i.e., the active one).

If the arbitrators are operating in simplex mode, the active one will continue to be active and support all XRC's which connect to it. Thus, it is possible that both arbitrators are active in simplex mode. When the software connection between the arbitrators are re-established, the war? resolution will determine which is active.

ROUTER REDUNDANCY

Referring once again to FIG. 1, the architecture of the system of the invention provides for duplexed, redundant routers identified in FIG. 1 as ROUTER 1 and ROUTER 2. The routers are identical in all respects and connections to router ports are identical as shown in FIG. 1 by the connection of XRC 1 to port 24 and ROUTER 1 and to the corresponding port 24a on ROUTER 2. FIG. 1 also illustrates ports 13a and 27a on ROUTER 2 which correspond to, and are connected in parallel with, ports 13 and 27, respectively, of ROUTER 1.

During normal operation, assume an XRC on a first LAN connected to port 24 of ROUTER 1 communicates with ARB 1 on a LAN connected to port 30 of ROUTER 1 with ROUTER 1 serving as intermediary between the LAN's. The conventional architecture and operation of ROUTER 1 enables it to determine that the packets placed on the LAN and received at port 24 should be forwarded to the LAN connected to port 30. In the conventionally-available router products, such routing takes place at the IP addressing level beneath which the link layer (ETHERNET) has separate address assignments. To accommodate both layers, each router maintains two tables—a routing table and an arp table. The routing table is used to determine how to route to a remote IP address, while the arp table is used to determine what ETHERNET address needs to be used to get to the give IP address.

In a single router configuration, any host on a LAN when attempting to send a packet to another host on another LAN consults its routing table to determine whether the remote host is on the same subnet and, if not, to which intervening router it needs to send a packet. The route which it finds in this case will be a default route which names one of the routers as a "gateway". However, to ensure delivery of the packet, the host on the first LAN must determine the router's ETHERNET address, and does so by consulting its arp table.

This operation is valid for so long as the intervening router continues to be operational. If the router fails, the presence of the second router is of no consequence unless all hosts are able to change their routing and arp tables to reflect the change in availability. The router products available from cisco Systems, Inc., incorporate a Gateway Discovery Protocol (GDP) to enable such a change. Details on this protocol may be found in the publication available from cisco Systems, Inc., entitled ROUTER PRODUCTS CONFIGURATION AND REFERENCE.

When the Gateway Discovery Protocol is enabled, each router is configured to broadcast a GDP report message indicating its availability on the XRC and ARB LANs. This message is broadcast periodically unless configured otherwise. To enable the Gateway Discovery Protocol, an entry must be made in the router configuration for each port attached to LANs on which hosts running an associated GDP daemon process (gdpd) reside.

Thus, in the preferred embodiment, a designated host on each LAN serving an XRC or arbitrator computer runs a gdpd which receives the GDP report messages and maintains a list of routers from which these messages are received. Entries on this list may be aged and purged. If the gdpd of a host does not receive a GDP report message from a router within an aging interval, it clears the router entry from its interval tables, deletes the router from a kernel routing table and clears a kernel arp table. Any existing connections which hosts have to other hosts via the purged route/arp entries undergo "rediscovery" and are routed by way of the second router. The rediscovery steps include having the default route changed to point to the new router by gdpd and obtaining a new arp by broadcasting an arp request and receiving the second router's response.

Although the present invention has been described with reference to a specific preferred embodiment, it will be manifest to those skilled in the art that various changes in form and detail may be made to it without departing from its spirit and scope. For example, specific user connectivity data structures have been described. These structures are necessary to restart the distribution of securities transaction information when a database computer facility fails. In fact, the 1-for-N redundancy architecture of the invention may be practiced using other data structures for other purposes which provide routing information between a serving computer facility and a set of users through a communication structure.

We claim:

1. A computer product combination for providing computer redundancy in a computer system which distributes securities information to a plurality of users through a plurality of computer facilities and includes a communication facility connected to the computer facilities which routes securities information from each computer facility to a respective set of users, the computer product combination including:

means for obtaining sets of connectivity data structures from a plurality of computer facilities, each set of connectivity data structures including data for routing securities information from a respective computer facility to a respective set of users;

means for storing the sets of connectivity data structures in a single archive database separate from the plurality of computer facilities;

means for periodically obtaining state of health (SOH) information from each computer facility of the plurality of computer facilities, SOH information indicating a level of operation of a computer facility;

means for detecting a failed computer facility in response to SOH information from the failed computer facility; and means for substituting a spare computer facility for the failed computer facility by transferring to the spare computer facility a set of connectivity data structures for the failed computer facility from the archive database.

2. The computer product combination of claim 1, further including:

a pair of arbitrator computers;

means for operating the pair of arbitrator computers in a duplexed mode in which a first arbitrator computer is designated as an active computer and a second arbitrator computer is designated as a standby computer, the active computer performing the functions of obtaining sets of connectivity data structures, storing the sets of connectivity data structures, obtaining state of health information, detecting a failed computer facility, and substituting a spare computer facility; and means for detecting the failure of the active computer, causing the active computer to cease operation, and causing the standby computer to perform the functions of obtaining sets of connectivity data structures, storing the sets of connectivity data structures, obtaining state of health information, detecting a failed computer facility, and substituting a spare computer facility.

3. The computer product combination of claim 1, wherein each set of connectivity data structures includes:

a user directory for listing users and routing paths to the users; and a communication configuration structure for listing routing path characteristics.

4. The computer product combination of claim 1, wherein the securities information is accessed in response to user-designated symbols, each user connectivity data structure including:

at least one table for mapping user-designated symbols to users which have designated the symbols;

a user directory coupled to the at least one table, the user directory listing users and routing paths to the users; and a communication configuration data structure coupled to the user directory, the communication configuration data structure listing routing path characteristics.

5. The computer product combination of claim 1, wherein SOH information includes a value indicating a number of alarms which have occurred in a computer facility.

6. A computer product combination for use in each computer facility of a plurality of computer facilities, comprising:

a node supervisor for a computer facility that has means for communicating with an arbitrator computer facility;

state of health (SOH) monitor means in the node supervisor for calculating a state of health value in response to alarms indicating process termination or task degradation, the SOH value indicating a level of operation of the computer facility;

a database checkpoint means for naming and transferring connectivity data structures which define communication routing paths between the computer facility and users of a set of users served by the computer facility; and means in the node supervisor for sending messages containing the SOH information and connectivity data structures to an arbitrator computer.

7. The computer product combination of claim 6, wherein the set of connectivity data structures includes:

a user directory for listing users and routing paths to the users; and a communication configuration structure for listing routing path characteristics.

8. A computer product combination for providing computer redundancy in a computer system which distributes securities information to a plurality of users through a plurality of computer facilities and includes a communication facility connected to the computer facilities which routes securities information from each computer facility to a respective set of users, the computer product combination including:

arbitrator instruction means for operating an arbitrator computer connected to the computer facilities; and redundancy program means for causing the arbitrator computer to detect and replace a failed computer facility by executing the steps of:

obtaining sets of connectivity data structures from a plurality of computer facilities, each set of connectivity data structures including data from routing securities information from a respective computer facility to a respective set of users;

storing the sets of connectivity data structures in a single archive database separate from the plurality of substantially identical computer facilities;

periodically obtaining state of health (SOH) information from each computer facility of the plurality of computer facilities, SOH information indicating a level of operation of a computer facility;

detecting a failed computer facility in response to SOH information from the failed computer facility; and substituting a spare computer facility tier the failed computer facility by transferring to the spare computer facility a set of connectivity data structures for the failed computer facility from the archive database.

9. The computer product combination of claim 8, wherein each set of connectivity data structures includes:

a user directory for listing users and routing paths to the user; and a communication configuration structure for listing routing path characteristics.

10. The computer product combination of claim 9, wherein the securities information is accessed in response to user-designated symbols, each user connectivity data structure including:

at least one table for mapping user-designated symbols to users which have designated the symbol;

a user directory coupled to the at least one table, the user directory listing users in routing paths to the users; and a communication configuration data structure coupled to the user directory, the communication configuration data structure listing routing path characteristics.

11. The computer product combination of claim 9, wherein SOH information includes a value indicating a number of alarms which have occurred in a computer facility.

* * * * *